(12) United States Patent
Scharfe et al.

(10) Patent No.: US 7,241,336 B2
(45) Date of Patent: Jul. 10, 2007

(54) PYROGENICALLY PRODUCED ALUMINUM-SILICON MIXED OXIDES

(75) Inventors: Thomas Scharfe, Alzenau (DE); Ronald Apel, Rheinfelden (DE); Alfons Moster, Rheinfelden (DE); Helmut Mangold, Rodenbach (DE); Ralph Brandes, Princeton, NJ (US)

(73) Assignee: Degussa GmbH, Dusseldorf (DE)

( * ) Notice: Subject to any disclaimer, the term of this patent is extended or adjusted under 35 U.S.C. 154(b) by 0 days.

(21) Appl. No.: 10/199,504

(22) Filed: Jul. 22, 2002

(65) Prior Publication Data

US 2003/0095905 A1    May 22, 2003

(30) Foreign Application Priority Data

Jul. 20, 2001    (DE) ............................... 101 35 452

(51) Int. Cl.
  *C09D 11/02*   (2006.01)
  *C09D 17/00*   (2006.01)
  *C09C 1/28*    (2006.01)

(52) U.S. Cl. ................. 106/31.9; 106/483; 423/327.1; 423/625; 428/32.1; 428/32.11

(58) Field of Classification Search ............... 106/482, 106/491, 483, 31.9; 501/128; 423/336, 423/337, 327.1, 625, 628; 428/32.1, 32.11
  See application file for complete search history.

(56) References Cited

U.S. PATENT DOCUMENTS

| | | | |
|---|---|---|---|
| 4,286,990 A | 9/1981 | Kleinschmit et al. | |
| 5,380,687 A | 1/1995 | Mangold et al. | |
| 5,858,906 A * | 1/1999 | Deller et al. ................ | 502/170 |
| 6,197,073 B1 | 3/2001 | Kadner et al. | |
| 6,328,944 B1 * | 12/2001 | Mangold et al. ............ | 425/278 |
| 6,432,869 B1 * | 8/2002 | Krause et al. ............... | 502/239 |
| 6,455,455 B1 * | 9/2002 | Deller et al. ................ | 501/153 |
| 2001/0042493 A1 * | 11/2001 | Scharfe et al. .............. | 106/482 |
| 2003/0118499 A1 * | 6/2003 | Scharfe et al. .............. | 423/335 |
| 2003/0185739 A1 * | 10/2003 | Mangold et al. ............ | 423/335 |

FOREIGN PATENT DOCUMENTS

| | | |
|---|---|---|
| CA | 2307057 A1 | 10/2000 |
| DE | 196 50 500 A1 | 6/1998 |
| DE | 198 47 161 A1 | 4/2000 |
| DE | 19847161 * | 4/2000 |
| EP | 0995718 A1 | 4/2000 |

OTHER PUBLICATIONS

Verlag Chemie, *Ullmanns Encyklopädie der Technischen Chemie*, 1982, pp. 464 and 465, Deerfield Beach, Florida—Basel, no date.
Verlag Chemie, Ulmanns Encyklopadie der technischen Chemie, vol. 21, p. 465 (see document), no date.

* cited by examiner

*Primary Examiner*—Anthony J. Green
(74) *Attorney, Agent, or Firm*—Venable LLP; Thomas G. Wiseman

(57) ABSTRACT

Pyrogenically produced aluminum-silicon mixed oxides with a BET surface of more than 300 m²/g and a composition of 0.01 to 99.99% by wt. $Al_2O_3$, remainder $SiO_2$ are produced in accordance with the method of flame pyrolysis or preferably flame hydrolysis by a joint combustion of the gaseous raw substances. They can be used to produce coating colors, especially for inkjet papers or inkjet foils or other inkjet materials.

14 Claims, No Drawings

PYROGENICALLY PRODUCED ALUMINUM-SILICON MIXED OXIDES

CROSS-REFERENCE TO RELATED APPLICATIONS

This application claims priority to application no. DE 101 35452.5, filed Jul. 20, 2001 in Germany, which is incorporated herein by reference.

BACKGROUND OF THE INVENTION

1. Field of the Invention

The invention relates to novel, pyrogenically produced aluminum-silicon mixed oxides, a method for their production, the production of corresponding dispersions and to their use as a component in inks or dyes for inkjet media.

2. Background Information

EP 0 023 588, EP 0 585 544 and EP 1 048 617 teach flame-hydrolytically produced, powdery aluminum-silicon mixed oxides with an amorphous structure. Thus, EP 0 023 588 describes the production of aluminum-silicon mixed oxides with a BET surface of 50 to 200 m$^2$/g and an aluminum oxide content of 0.5 to 20% by wt.

EP 0 585 544 describes the production of aluminum-silicon mixed oxides with a BET surface of 50 to 200 m$^2$/g and an aluminum oxide content of 65 to 72.1% by wt. Al$_2$O$_3$.

EP 1 048 617 describes the production of an aluminum-silicon mixed oxide with a BET surface of 50 to 300 m$^2$/g and an aluminum oxide content of 1 to 99.999% by wt. Al$_2$O$_3$.

The known aluminum-silicon mixed oxides have the disadvantage that the degree of gloss, color intensity and resolution are insufficient in inkjet printing.

The present invention addresses the problem of producing an aluminum-silicon mixed oxide that does not have these disadvantages.

SUMMARY OF THE INVENTION

It is an object of the invention to provide pyrogenically produced aluminum-silicon mixed oxides that are characterized in that they have a BET surface of more than 300 m$^2$/g, preferably between 300 and 600 m$^2$/g and a composition of 0.01 to 99.99% by wt. Al$_2$O$_3$, remainder SiO$_2$, preferably a composition of 0.3 to 1.3% by wt. Al$_2$O$_3$.

In an especially preferred embodiment of the invention, the silicon-aluminum mixed oxide of the invention can have a surface of 310 to 330 m$^2$/g.

The aluminum oxide content of Al$_2$O$_3$ can preferably be 0.91-0.93% by wt.

The aluminum-silicon mixed oxides of the invention can be produced by evaporating volatile compounds of aluminum and of silicon in a known manner, mixing the vapors with one another, preferably in a ratio that yields the desired composition of the mixed oxide, and reacting this mixture in a flame that produces water in situ such as, e.g., in a flame fed with hydrogen and oxygen.

Aluminum-silicon mixed oxides of the invention with a specific BET surface above 300 m$^2$/g are superbly suited for producing dispersions or coating colors that result in the further processing in inkjet media (inkjet paper, inkjet foil) with excellent application and printing properties.

The high-surface aluminum-silicon mixed oxides of the invention also have other physicochemical properties compared to pure, pyrogenic silicon dioxide, with a different chemical structure that distinguishes them during the production of the dispersion or during printing.

Thus, aqueous dispersions can be produced from the aluminum-silicon mixed oxides in accordance with the invention and with a high surface that are processed to coating colors that are applied onto paper or foil and can then be printed with an inkjet printer and result in excellent printing products.

The invention also includes dispersions consisting of a liquid phase, preferably water, and a solid phase. The solid phase consists of a pyrogenic mixed oxide in accordance with the invention, whose BET surface is preferably between 300 and 600 m$^2$/g and whose components include silicon dioxide and an aluminum oxide. The amount of aluminum oxide is between 0.01 and 99.99% by wt. and the solid phase in the dispersion has a percentage by weight component between 0.001 and 80% by wt.

According to the invention, dissolvers, ball mills, cone mills, bead mills, jet mills and high-pressure liquid jet mills, inter alia, can be used as dispersing units.

For other application areas, for example, when the dispersions are used as polishing agents (CMP polishing), the dispersion can be carried out effectively in the neutral and/or alkaline pH range using lyes, e.g., potassium hydroxide solution.

Binding agents other than polyvinyl alcohol (PVA) can also be used in combination with PVA or alone such as, e.g., polyvinylpyrrolidones, polyvinyl acetates, styrene acrylate lattices, polyacrylates, starch, casein, gelatins and also used in other ratios to the pyrogenic mixed oxide than cited in example 3.

Both the solids content of the dispersion as well as the solids content of the coating colors can be varied in comparison to example 3. Further possibilities of variation consist of changing the pH, the dispersion type, the composition of the coating color formulation and changing the dispersion medium.

In order to increase the water resistance of the binder system and therewith the coating, cross-linking agents such as, for example, zirconium oxides, boric acid, melamine resins, glyoxal and isocyanates and other molecules that link the molecular chains of the binder system to each other can be used.

Moreover, auxiliary agents such as optical brighteners, defoamers, wetting agents, pH buffers, UV absorbers and auxiliary viscosity agents can be used.

The following are examples of cationic substances for the cationization of the binder and/or of the dispersion of the pyrogenic mixed oxide or oxide: Polyethylene imine, polyallylamines, polyvinylamines, polymers consisting of cationic monomers such as primary, secondary and tertiary amines, located on the side chains, and quaternary ammonium compounds.

The following criteria are important when using in inkjet media and for a photorealistic reproduction: High gloss, high color intensity and high resolution.

The high-surface aluminum-silicon mixed oxide in accordance with the invention is distinguished over a known, pure, pyrogenic silicon dioxide with the same BET surface (commercially obtainable as aerosil 300 of the Degussa AG company) by an improved (that is, simpler) dispersibility and distinctly improved properties of printing and color reproduction when used as a component in inkjet coatings.

Compared to a known aluminum-silicon mixed oxide with a lesser surface (commercially obtainable as MOX 170 from the Degussa AG company), the mixed oxides of the invention exhibit an elevated degree of gloss and a higher resolution power during inkjet coating.

DETAILED DESCRIPTION OF THE INVENTION

EXAMPLE 1

Production of Pyrogenic Mixed Oxide in Accordance with the Invention

48 Nm$^3$/h nuclear or reaction hydrogen are mixed in a burner with a known design together with 195 Nm$^3$/h air and 135 kg/h previously evaporated SiCl$_4$. 1.2 kg/h gaseous AlCl$_3$ that had previously been evaporated at approximately 300° C. was fed into this mixture. This mixture is burned in a flame tube, during which approximately 30 Nm$^3$/h air is additionally also drawn into this flame tube by applying a vacuum.

After having passed the flame tube, the powder produced is separated from the gases containing hydrochloric acid in a filter or cyclone. Any remnants of still-adhering hydrochloric acid are removed from the pyrogenic mixed oxide by a treatment at elevated temperature. The aluminum-silicon mixed oxide obtained has the following physico-chemical characteristic data:

| | |
|---|---|
| BET m$^2$/g: | 310-330 |
| pH (4% aqu. disp.) | 3.8-3.9 |
| stamping density g/l: | circa 50 |
| chloride content ppm | <250 |
| Al$_2$O$_3$ content % by wt. | 0.91-0.93 |

The commercially available pyrogenic oxides aerosil 300 (Degussa AG company) and MOX 170 (Degussa AG company) are used as reference products. Table 1 shows the characteristic data for the oxides.

TABLE 1

Physico-chemical characteristic date of the pyrogenic mixed oxide according to example 1 and reference examples

| | Pyrogenic mixed oxide in accordance with the invention and according to example 1 | Reference example aerosil 300 | Reference example aerosil MOX 170 |
|---|---|---|---|
| BET m$^2$/g | 310-330 | 300 ± 30 | 170 ± 30 |
| pH (4% aqueous disp.) | 3.8-3.9 | 3.7-4.7 | 3.4-4.5 |
| Stamping density g/l | Circa 50 | 50 | 50 |
| Chloride content ppm | <250 | <250 | <250 |
| Al$_2$O$_3$ content % by wt. | 0.91-0.93 | <0.05 | 0.3-1.3 |
| SiO$_2$ content % by wt. | 99.07-99.09 | >99.8 | >98.3 |

EXAMPLE 2

Production of Aqueous Dispersions

Dispersion A is a 20% (w=0.20) aqueous dispersion containing the pyrogenic oxide or the pyrogenic mixed oxide. This oxide is worked in by a dissolver at 1000 revolutions per minute (rpm) into water compounded with 1.25% by wt. acetic acid (relative to the total dispersion). The dispersion is completed by a 60-minute dispersing of the pyrogenic mixed oxide or of the oxide with a rotor-stator system at 1000 rpm in a water-cooled double-jacket system and simultaneous retention of the pH.

The pyrogenic mixed oxide in accordance with example 1 and the aerosil MOX 170 can be worked into purified water, pyrogenic silicon dioxide (aerosil 300) and have a lesser thickening action, that is, the dispersions have a lower viscosity.

The distribution of the particle size in the dispersions produced in this manner is measured with the aid of a laser diffraction device (Horiba LB-500). The d$_{50}$ value of these dispersions is shown in table 2.

TABLE 2

D$_{50}$ values of the dispersions produced in accordance with example 2

| | Pyrogenic mixed oxide in accordance with the invention and according to example 1 | Aerosil 300 | Aerosil MOX 170 |
|---|---|---|---|
| d$_{50}$ value nm | 71 | 121 | 170 |

The easier dispersibility of the mixed oxide of the mixed in accordance with the invention can be recognized by the smaller d$_{50}$ value.

Inkjet inks are produced starting from these 20% aqueous dispersions.

EXAMPLE 3

Recipe for Producing a Pyrogenic Mixed-oxide Dispersion and an Inkjet Ink

The dispersions A according to example 2 and solution B are used.

Solution B is a 10% (relative to PVA) aqueous dispersion of polyvinyl alcohol (solid, abbreviation PVA) Mowiol 40-88 of the Clariant company.

Dispersion A and solution B are combined within 10 minutes under agitation at 500 rpm with a dissolver disk to a dispersion C.

Dispersion A and solution B are mixed in such a manner that a mass ratio of 100:70 or aerosil (or pyrogenic mixed oxide) to PVA results in the later dispersion C.

In the case of a 20% dispersion A the latter is mixed with solution B in a weight ratio of 1.40: 1 in order to obtain the mass ratio (100: 70 of the solids). Furthermore, enough water is added (if required) that a 9.6 to 10.9% (relative to the sum of the solids (pyrogenic mixed oxide or oxide+PVA)) dispersion C results independently of the pyrogenic mixed oxide or oxide used.

The recipe used here is to be understood only as a model recipe of an inkjet recipe.

During the further processing of the coating color the coating color is ventilated in a desiccator by applying a vacuum in order to remove air bubbles present in the dispersion, which vacuum can be produced, e.g., with a water pump.

The viscosity of this dispersion C, the inkjet coating color, is measured after 24 h with a Brookfield viscosimeter.

TABLE 3

Viscosity and solid content of dispersion C (inkjet coating color)

|  | Pyrogenic mixed oxide in accordance with the invention and according to example 1 | Aerosil 300 | Aerosil MOX 170 |
|---|---|---|---|
| Solid content of the coating color (pyrogenic oxide + PVA) % by wt. | 9.8 | 9.6 | 10.9 |
| Viscosity (mPa s) At 100 rpm | 616 | 573 | 521 |

The coating colors of table 3 are applied with a profiled wiper rod onto an untreated polyester foil (thickness 100 micrometers). The wet film thickness of the coating color is 120 micrometers. The coating is dried at 105° C. for 8 minutes.

The foil with the applied coating is printed on an Epson Stylus Colour 800 with the highest resolution.

The evaluation of the printing results is shown in table 4.

TABLE 4

Evaluation of the printing results:

| Evaluated property | Pyrogenic mixed oxide acc. to example 1 | | Aerosil 300 | | Aerosil MOX 170 | |
|---|---|---|---|---|---|---|
|  | Evaluation | Grade | Evaluation | Grade | Evaluation | Grade |
| Gloss | Good | 2 | Deficient | 5 | Satisfactory | 3 |
| Color intensity | Good-very good | 1.5 | Satisfactory | 3 | Good-very good | 1.5 |
| Resolution | Very good | 1 | Good | 2 | Good-very good | 1.5 |
| Adhesion to foil | Good | 2 | Deficient, formation of tears | 5 | Good | 2 |
| Average | Good to very good | 1.63 | Sufficient to satisfactory | 3.75 | Good | 2 |

Best grade = 1, poorest grade = 6

As regards the sum of all properties of the coatings, especially the gloss, color intensity and resolution, which are important criteria for photo-realistic inkjet media, the aqueous dispersion produced with the pyrogenic mixed oxide of example 1 in accordance with the invention and the coating color produced from said dispersion and also the coating produced from it display the best results by far when printing with an inkjet printer.

This is all the more remarkable since the coating is a single coat with a relatively slight application of coating.

The coating containing the known aerosil MOX 170 also has a good inkjet capability. However, the gloss is less than in the case of the coating produced with the pyrogenic, high-surface mixed oxide in accordance with the invention.

The known aerosil 300 does not produce a homogeneous film in this coating-color formulation, even though the BET surface is very similar to the product of the invention.

The reason for this differing behavior is probably due to the better dispersibility of the pyrogenic mixed oxide of the invention, which manifests itself in the lesser $d_{50}$ values.

What is claimed is:

1. A pyrogenically produced aluminum-silicon mixed oxide, having a BET surface of more than 300 m$^2$/g and a composition of 0.3 to 1:3% by wt. $Al_2O_3$, with the remainder being SiO2.

2. The pyrogenically produced aluminum-silicon mixed oxide of claim 1 wherein the amount of $Al_2O_3$ present is 0.91 to 0.93% by wt.

3. A dispersion consisting essentially of a liquid phase and of a solid phase, wherein the solid phase is a pyrogenic mixed oxide having a BET surface of more than 300 m$^2$/g and a composition of 0.3 to 1.3% by wt. $Al_2O_3$, with the remainder being $SiO_2$, and is present in an amount between 0.001 and 80% by weight of said dispersion.

4. The dispersion of claim 3 wherein the amount of $Al_2O_3$ present is 0.91 to 0.93% by wt.

5. An inkjet coating composition comprising a pyrogenically produced aluminum-silicon mixed oxide having a BET surface of more than 300 m$^2$/g and an $Al_2O_3$ content of 0.3-1.3% by wt., with the remainder being $SiO_2$ and a $d_{50}$ value suitable for easier dispersability.

6. The inkjet coating composition of claim 5 wherein the amount of $Al_2O_3$ present is 0.91 to 0.93% by wt.

7. The inkjet coating composition of claim 5 wherein the mixed metal oxide is prepared by evaporating volatile compounds of aluminum and of silicon to form vapors, mixing the vapors and reacting mixture in a flame that produces water in situ.

8. A process for producing a coating composition comprising evaporating volatile compounds of aluminum and of silicon to form vapors, mixing the vapors and reacting mixture in a flame that produces water in situ, recovering $Al_2O_3$-$SiO_2$-mixed oxide product having BET surface of more than 300 m$^2$/g and an $Al_2O_3$ content of 0.3-1.3 wt. % and forming the coating composition.

9. The process of claim 8 wherein the coating composition is an inkjet coating composition.

10. In an inkjet medium wherein the improvement comprises a pyrogenically produced aluminum-silicon mixed oxide, having a BET surface of more than 300 m$^2$/g and an $Al_2O_3$ content of 0.3-1.3% by wt., with the remainder being $SiO_2$.

11. The inkjet medium of claim 10 wherein the mixed metal oxide is prepared by evaporating volatile compounds of aluminum and of silicon to form vapors, mixing the vapors and reacting mixture in a flame that produces water in situ.

12. The inkjet medium of claim 10 wherein the $Al_2O_3$ is present in amounts between 0.91 and 0.93% by wt.

13. The inkjet medium of claim 10 wherein the medium is inkjet paper.

14. The inkjet medium of claim 10 wherein the medium is inkjet foil.

* * * * *